(12) United States Patent
Onishi et al.

(10) Patent No.: US 6,347,537 B1
(45) Date of Patent: Feb. 19, 2002

(54) METHOD OF DRAWING A TWISTED OPTICAL FIBER

(75) Inventors: Masashi Onishi; Koji Amemiya; Masahiro Takagi; Yoichi Ishiguro, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/510,237

(22) Filed: Feb. 22, 2000

Related U.S. Application Data

(60) Division of application No. 08/818,396, filed on Mar. 14, 1997, now Pat. No. 6,076,376, which is a continuation-in-part of application No. 08/609,830, filed on Mar. 1, 1996, now abandoned.

(30) Foreign Application Priority Data

| Mar. 1, 1995 | (JP) | ............................................... 7-041820 |
| Oct. 30, 1995 | (JP) | ............................................... 7-281809 |
| Mar. 14, 1996 | (JP) | ............................................... 8-057881 |

(51) Int. Cl.[7] ...................... C03B 37/027; C03B 37/075
(52) U.S. Cl. .......................................... 65/402; 65/504
(58) Field of Search ................................... 65/402, 504

(56) References Cited

U.S. PATENT DOCUMENTS

| 4,163,370 A | 8/1979 | Kurth |
| 5,178,313 A | 1/1993 | Le Comple |
| 5,298,047 A | * 3/1994 | Hart |
| 5,647,884 A | 7/1997 | Overton |

FOREIGN PATENT DOCUMENTS

| EP | 0 112 222 | 6/1984 |
| EP | 0 582 405 | 2/1994 |
| EP | 0 729 919 | 9/1996 |
| GB | 2 101 762 | 1/1983 |
| JP | 6-171970 | 6/1994 |

OTHER PUBLICATIONS

Patent Abstracts of Japan, vol. 007, No. 091 (C–162), Apr. 15, 1983 & JP 58 020746A (Nippon Denshin Denwa Kosha), Feb. 7, 1983.

* cited by examiner

Primary Examiner—John Hoffman

(57) ABSTRACT

An optical fiber is rolled by a swing motion of a swing guide roller in order to impart a predetermined twist to it effectively, and its polarization dispersion is suppressed equivalently as in a perfectly circular concentric optical fiber. A method of manufacturing such an optical fiber is also provided. As a swing guide roller swings, the optical fiber is rolled on its roller surface, so that a clockwise twist and a counterclockwise twist are imparted to the optical fiber alternately. At this time, the optical fiber is fitted in a V-shaped narrow groove formed at the central portion of the roller surface of a next-stage first stationary guide roller provided just beside the swing guide roller. Rolling of the optical fiber on the roller surface of the first stationary guide roller is suppressed, thereby helping smooth rolling of the optical fiber on the roller surface of the swing guide roller. As a result, a twist can be imparted to the optical fiber highly efficiently in accordance with the swing speed of the swing guide roller.

3 Claims, 14 Drawing Sheets

— ● — ● — : WHEN V-SHAPED NARROW GROOVE SERVING AS OPTICAL FIBER ROLLING PREVENTION MEANS IS PROVIDED TO FIRST STATIONARY GUIDE ROLLER

— ○ — ○ — : WHEN NO OPTICAL FIBER ROLLING PREVENTION MEANS IS PROVIDED TO FIRST STATIONARY GUIDE ROLLER SO THAT OPTICAL FIBER CAN BE ROLLED.

RELATIVE HEIGHT Δh (mm) OF LOWEST
PORTION OF FIRST STATIONARY GUIDE
ROLLER WITH RESPECT TO LOWEST
PORTION OF SWING GUIDE ROLLER

—×—×— : WHEN D = 180 mm
—●—●— : WHEN D = 250 mm
—○—○— : WHEN D = 500 mm

GAP d (mm) BETWEEN PAIR OF GUIDE
ROLLERS FOR OPTICAL FIBER SWING
SUPPRESSION

× : WHEN L = 30 mm
△ : WHEN L = 50 mm
● : WHEN L = 100 mm
○ : WHEN L = 200 mm
◉ : WHEN PAIR OF GUIDE ROLLERS ARE
    FIXED NOT TO BE ROTATABLE

METHOD OF DRAWING A TWISTED OPTICAL FIBER

This is a division of application Ser. No. 08/818,396, filed Mar. 14, 1997, now U.S. Pat. No. 6,076,376. Which is a Continuation-In-Part of application Ser. No. 08/609,830 filed Mar. 1, 1996 (now abandoned).

BACKGROUND OF THE INVENTION

1. Field of the Invention

The present invention relates to an optical fiber and a method of manufacturing the same. The present invention can be applied to a 1.3-$\mu$m single-mode ribbon fiber, a dispersion-shifted fiber, and a dispersion-compensated fiber, as well as any other types of optical fibers and their manufacturing methods, and is particularly suitable to a dispersion-compensated fiber having a high Ge content in its core, concretely, a dispersion-shift fiber (DSF) and a dipsersion-flat fiber (DFF) having a $GeO_2$ content at about 0.5 to 1.0% in their cores, and a dispesion-compensation fiber (DCF) having a $GeO_2$ content at about 1 to 3% in its core and a fiber for an optical amplifier and large PMD (Polarization Mode Dispersion: also called merely "polarization dispersion"), and a method of manufacturing the same.

2. Related Background Art

In a conventional optical fiber manufacturing method in which one end of an optical fiber preform is softened by heating and an optical fiber is drawn from it, it is difficult to make the core portion of the optical fiber and a cladding portion around the core portion to have perfectly circular and concentric sections, and the sections of the core portion and cladding portion usually become slightly elliptic or slightly distorted circular. Accordingly, the refractive index distribution in the sectional structure of the optical fiber is not completely uniform, which causes a difference in group velocity of two orthogonally polarized waves in the section of the optical fiber, thereby undesirably increasing polarization dispersion. For this reason, when the optical fiber is put into a practical use as a submarine cable or trunk cable that require large-capacity, long-distance transmission, the adverse influence of the polarization dispersion appears largely. Even in optical fibers having almost the same diameter, the higher the content of the dopant, e.g., $GeO_2$, added to the core, the larger the polarization dispersion.

SUMMARY OF THE INVENTION

It is an object of the present invention to effectively impart a predetermined twist to an optical fiber by rolling the optical fiber on the roller surface of a guide roller in accordance with the swing motion of the guide roller, thereby providing an optical fiber in which, even if the sectional shapes of its core portion and cladding portion are not perfectly circular and concentric, polarization dispersion can be suppressed in the elongated optical fiber as a whole equivalently as in a case wherein the sections of the core portion and the cladding portion are perfectly circular and concentric, and a method of manufacturing the same.

The present invention relates to an optical fiber manufacturing method comprising the first step of drawing an optical fiber from an optical fiber preform, the second step of coating the optical fiber with a predetermined coating material, and the third step of imparting a predetermined twist to the optical fiber coated with the predetermined coating material. The third step further comprises the first substep of guiding the optical fiber coated with the predetermined coating material with a first guide roller that swings periodically, and rolling the optical fiber on a roller surface of the first guide roller in accordance with swing of the first guide roller, and the second substep of guiding the optical fiber that has passed through the first guide roller with a second guide roller provided to a next stage of the first guide roller and having a fixed rotating shaft, and suppressing the optical fiber from rolling on a roller surface of the second guide roller with an optical fiber rolling suppression means provided to the second guide roller.

The optical fiber rolling suppression means provided to the second guide roller is preferably a V-shaped, U-shaped, or convex narrow groove which is formed in the roller surface of the second guide roller to fit the optical fiber in it.

It is preferable that the outer diameter and position of each of the first and second guide rollers be adjusted so that a length with which the optical fiber contacts the roller surface of the first guide roller is substantially equal to or less than a roller circumference corresponding to a central angle of 90° of the first guide roller.

It is preferable that the roller surface of the first guide roller with which the optical fiber contacts be covered with a resin having a high coefficient of friction against the predetermined coating material of the optical fiber.

The resin to cover the roller surface of the first guide roller is preferably an urethane resin or an acrylic resin.

The optical fiber preferably has a drawing tension of 4.0 $kg/mm^2$ or more and 16 $kg/mm^2$ or less.

The third step preferably further comprises the substep of suppressing responsive motion of the optical fiber, which is caused by swing of the first guide roller, with an optical fiber responsive motion suppressing means provided on a preceding stage of the first guide roller.

It is preferable that the optical fiber responsive motion suppressing means be at least a pair of guide rollers which are provided above the first guide roller at a predetermined distance to oppose each other at a predetermined gap through which the optical fiber is passed.

Further, it is another object of the present invention to provide an optical fiber drawing method for reducing polarization characteristic of an optical fiber, comprising the steps of: drawing the optical fiber from an optical fiber preform; coating the optical fiber with a predetermined coating material; and guiding the optical fiber coated with the predetermined coating material with a first guide roller that swings periodically, and rolling the optical fiber on a roller surface of the first guide roller in accordance with swing of the first guide roller; and guiding the optical fiber that has passed through the first guide roller with a second guide roller provided to a next stage of the first guide roller and having a fixed rotating shaft and suppressing the optical fiber from rolling on a roller surface of the second guide roller with an optical fiber rolling suppression portion provided to the second guide roller, wherein the swing of the first guide roller is such that the maximum clockwise angle and the maximum counterclockwise angle of the first guide roller are equal, that a period of the clockwise swing which is the time from the beginning to the end of the clockwise swing of the first guide roller and a period of the counterclockwise swing which is the time from the beginning to the end of the counterclockwise swing of the first guide roller are equal, and that a swing direction of the first guide roller is reversed smoothly without stopping when the swing angle of the first guide roller becomes maximum.

It is preferable in the above method that an optical fiber responsive motion suppressing means is provided to a preceding stage of the first guide roller, the means comprises at least one pair of responsive motion suppressing rollers which are provided above the first guide roller at a predetermined distance, the responsive motion suppressing rollers opposing each other at a predetermined gap through which the optical fiber is passed, and direction of a roller shaft of one of the at least one pair of guide rollers is perpendicular to a direction of a rolling shaft of the other of the two pairs of guide rollers.

It is preferable that width of the roller surface of the first guide roller on which the optical fiber can be rolled, is not less than 3 mm.

It is preferable that the first guide roller has flanges at both sides of the roller surface, and the optical fiber does not come into contact with the flanges when the swing angle of the first guide roller becomes maximum.

It is more further object of the present invention to provide an apparatus used by an optical fiber drawing method comprising: a base; a pinion gear rotatably supported about a shaft by the base, the shaft being perpendicular to the rotating shaft of the first guide roller and passing through substantially center of the first guide roller; a rack gear meshing with the pinion gear; a first movable portion linearly moving as against the base in a direction perpendicular to a direction of the rotating shaft of the pinion gear, the rack gear being fixed to the first movable portion; a second movable portion linearly moving as against the first movable portion is a direction perpendicular to both direction of linear moving of the first movable portion and the direction of the rotating shaft of the pinion gear; and a motor rotating at constant velocity and giving a rotating motion with constant velocity as against the base to the second movable portion.

It is preferable in the above apparatus that materials of the rack gear and the pinion gear are different from each other.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In order to solve the problem of polarization dispersion in the prior art technique described above, an optical fiber manufacturing method has been proposed (see Japanese Patent Laid-Open No. 6-171970) in which, after an optical fiber is drawn from an optical fiber preform and is coated with a predetermined coating material, the optical fiber is guided by a guide roller whose rotating shaft swings periodically, thereby imparting a predetermined twist to the optical fiber.

Figure 1:
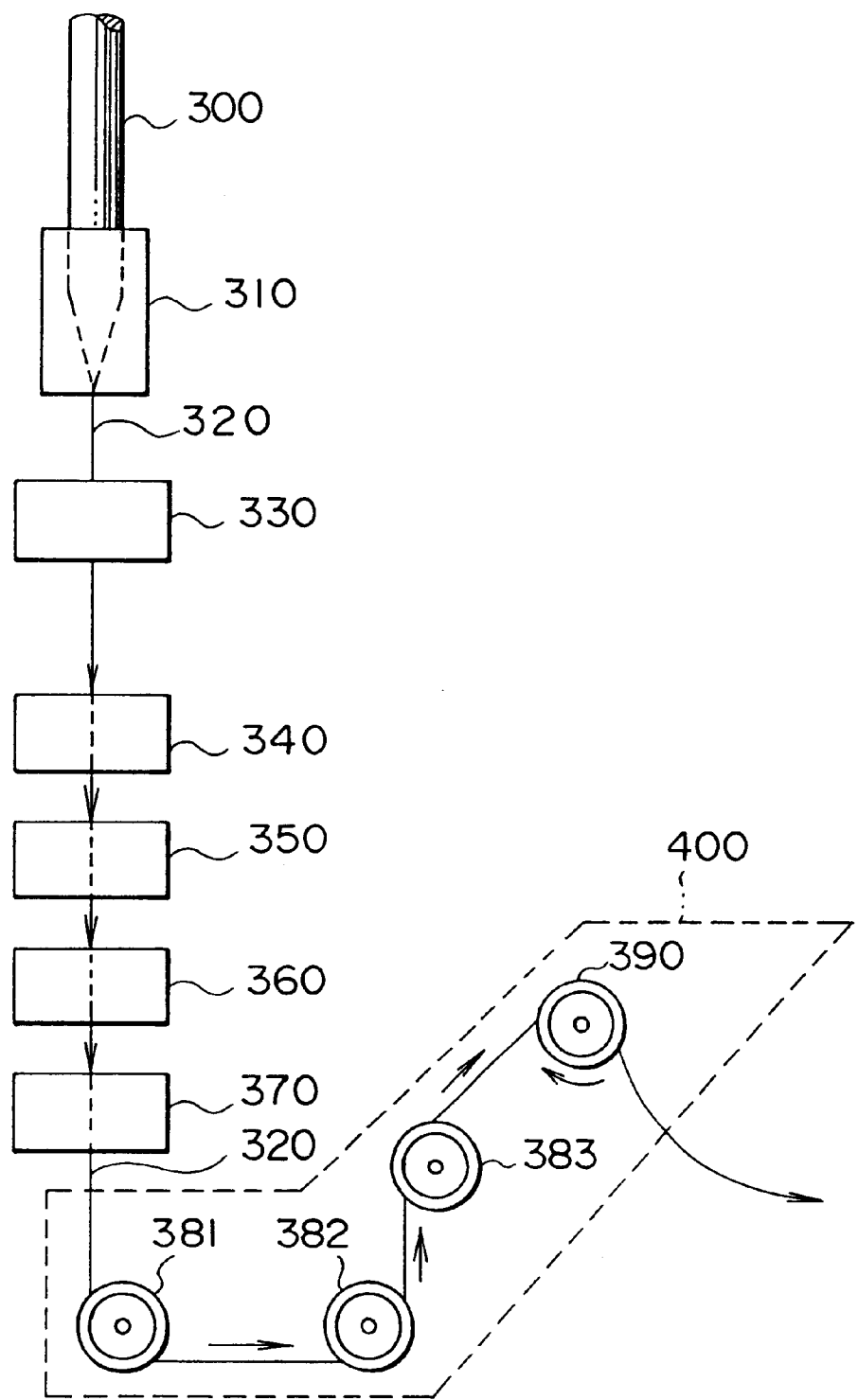
FIG. 1 is a process view showing an optical fiber manufacturing method.

The outline of this optical fiber manufacturing method will be described with reference to FIGS. 1 and 2. FIG. 1 is a manufacturing process view for explaining the optical fiber manufacturing method, and FIG. 2 is a view for explaining how to impart a twist to the optical fiber.

As shown in FIG. 1, an optical fiber preform 300 is fed into a drawing furnace 310 to be softened by heating in the drawing furnace 310. An optical fiber 320 is drawn from one end of the softened optical fiber preform 300. The drawn optical fiber 320 is passed through a coating unit 340 via a diameter monitor 330, to be coated with a polymer coating by the coating unit 340. Then, the optical fiber 320 is sequentially passed through a coating concentricity monitor 350, a coating resin setting unit 360 having, e.g., a UV lamp, and a coating diameter monitor 370.

Subsequently, the optical fiber 320 enters a zone 400 having first to third guide rollers 381, 382, and 383 and a tensile capstan 390 that pulls the optical fiber 320 with a predetermined force. The rotating shaft of the first guide roller 381 swings about an axis parallel to a tensile tower axis, which is the characteristic feature of this manufacturing method. The rotating shafts of the second guide roller 382 provided on the next stage of the first guide roller 381 and the third guide roller 383 provided on the next stage of the second guide roller 382 are fixed.

Figure 2:
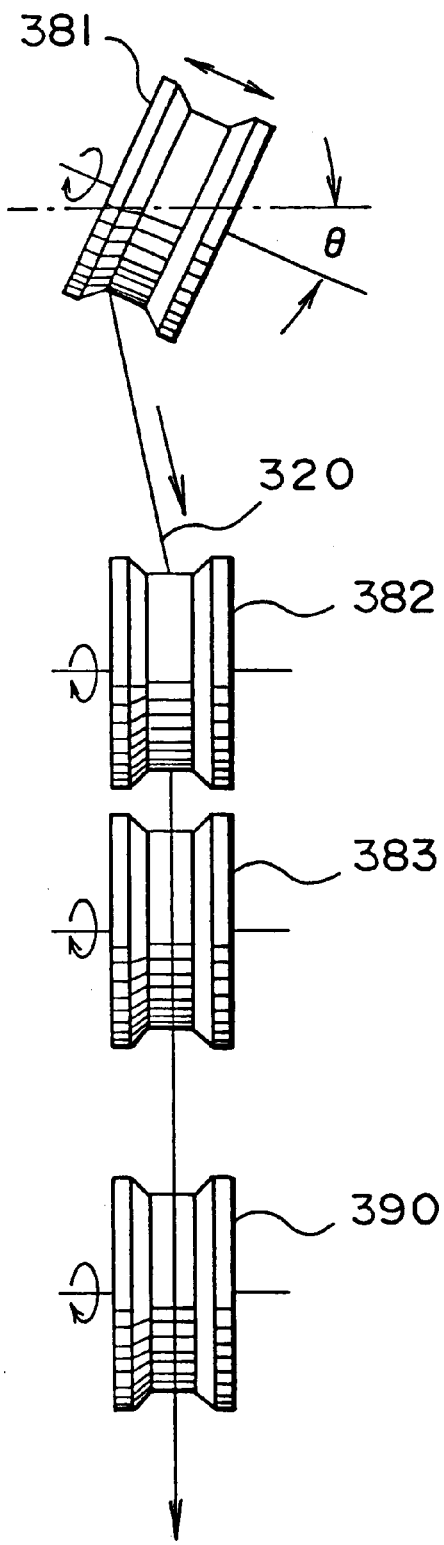
FIGS. 2 to 5 are views for explaining how to impart a twist to an optical fiber.

As shown in FIG. 2, when, for example, the first guide roller 381 is tilted about an axis parallel to the tensile tower axis by an angle θ, a lateral force on the sheet of FIG. 2 is applied to the optical fiber 320 by this tilt, and the optical fiber 320 rolls on the roller surface of the first guide roller 381. When this rolling is transmitted to the heated portion of the preform, a twist is imparted to the optical fiber 320 about a longitudinal axis. Subsequently, the first guide roller 381 is restored to the initial state. In this manner, when asymmetric reciprocal swing motion of the first guide roller 381 from an angle 0 to an angle +θ, as indicated by a double-headed arrow in FIG. 2, is repeated, a twist is imparted to the optical fiber 320 intermittently.

The swing motion of the first guide roller 381 is not limited to that shown in FIG. 2, but can be symmetric reciprocal motion of 2θ from an angle −θ to the angle +θ about an axis parallel to the tensile tower axis, or can be symmetric reciprocal motion in the direction of the rotating shaft of the first guide roller 381. In these cases, a clockwise twist and a counterclockwise twist with respect to the traveling direction are alternately imparted to the optical fiber 320.

As described above, according to the proposed optical fiber manufacturing method, since a twist is imparted to the optical fiber 320 intermittently or alternately, the optical fiber 320 can be provided in which, even if the sectional shapes of its core portion and cladding portion are not perfectly circular and concentric, polarization dispersion is suppressed in the elongated optical fiber as a whole equivalently as in a case wherein the core portion and the cladding portion are perfectly circular and concentric.

In the above optical fiber manufacturing method, however, due to the swing motion of the first guide roller 381, the optical fiber 320 cannot roll on the roller surface smoothly, and thus a predetermined twist cannot be effectively imparted to the optical fiber 320.

Figure 3:
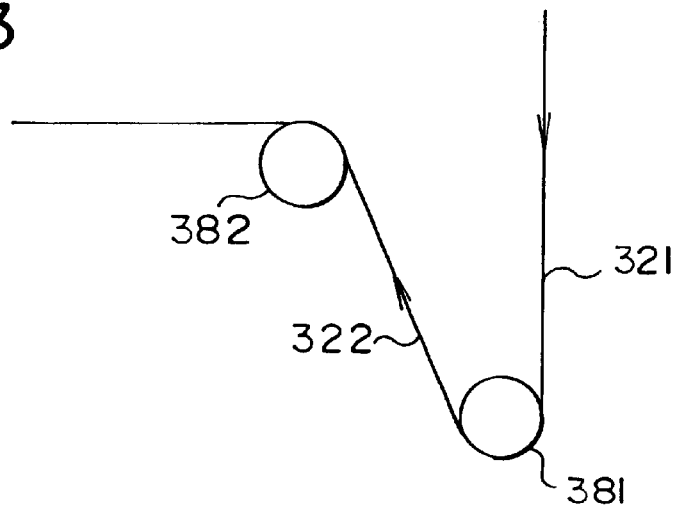
Figure 4:
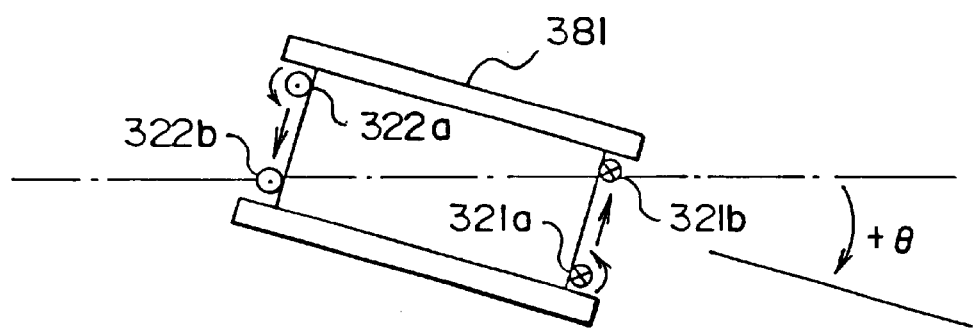
Figure 5:
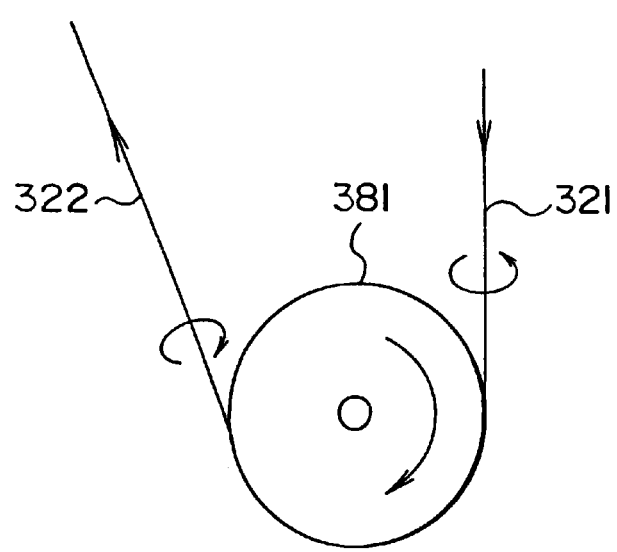

This point will be clarified with reference to FIGS. 3 to 5. FIG. 3 is a schematic view of the guide portion of an optical fiber manufacturing apparatus, FIG. 4 shows the first guide roller of FIG. 3 when viewed from the above, and FIG. 5 shows the first guide roller of FIG. 4 when viewed from the side.

As shown in FIG. 3, the rotating shaft of the first guide roller 381 swings about an axis parallel to the tensile tower axis. The second guide roller 382, which is located on the next stage of the first guide roller 381 and which has a fixed rotating shaft, is provided at a position relatively higher than that of the first guide roller 381. Accordingly, in FIG. 3, an optical fiber 321 fed from the drawing furnace is brought into contact with the first guide roller 381 along the right side surface, the bottom surface, and the left side surface of the first guide roller 381, and is separated, as an optical fiber 322, from the left side surface of the swing roller 381 and fed to the second guide roller 382. The length with which the optical fiber contacts the roller surface of the first guide roller 381 exceeds a roller circumference corresponding to a central angle 90°. Although not shown in FIG. 3, the roller width of the second guide roller 382 is the same as that of the first guide roller 381, in the same manner as in the case shown in FIG. 2.

A case wherein the optical fiber 320 is guided by the swingable first guide roller 381 under these conditions will be described.

As shown in FIGS. 4 and 5, in a state wherein the first guide roller 381 is tilted by the angle +θ, the optical fiber 321 that has gone near the right side surface of the first guide roller 381 from the drawing furnace 310 starts to be brought into contact with the roller surface of the first guide roller 381 from its right side surface, is kept in contact with it along its bottom surface until going near its left side surface, is then separated from it and is fed as the optical fiber 322 toward the second guide roller 382 on the next stage.

When the first guide roller 381 is restored to the initial state from this state, on the right side surface of the first guide roller 381, an optical fiber 321a rolls on the roller surface counterclockwise with respect to the traveling direction, and is to go near the position of an optical fiber 321b. Meanwhile, on the left side surface of the first guide roller 381, an optical fiber 322a rolls on the roller surface clockwise with respect to the traveling direction, and is to go near the position of an optical fiber 322b. In this manner, on the right and left side surfaces of the first guide roller 381, the rolling directions are opposite to each other, thereby interfering with rolling.

Accordingly, the counterclockwise rolling for changing the optical fiber 321a to the optical fiber 321b on the right side surface of the first guide roller 381 is interfered by the clockwise rolling for changing the optical fiber 322a to the optical fiber 322b on the left side surface of the first guide roller 381, so that the optical fiber partially slides on the first guide roller. Therefore, while a counterclockwise twist is supposed to be imparted to the optical fiber 320 in the traveling direction in accordance with rolling for changing the optical fiber 321a to the optical fiber 321b, it cannot be effectively imparted in practice.

The reason for this is as follows. First, as the second guide roller 382 is provided at a position higher than that of the first guide roller 381, the optical fiber 320 is brought into contact with not only the right side surface of the first guide roller 381 but also its left side surface, so that rolling of the optical fiber occurring on the left side surface interferes with rolling on the right side surface. Second, since the roller width of the second guide roller 382 is equal to that of the first guide roller 381, the optical fiber 320 can roll on the roller surface of the second guide roller 382 as well, so that rolling of the optical fiber 320 on the left side surface of the first guide roller 381 cannot be suppressed. Also, rolling of the optical fiber 320 on the second guide roller 382 has an effect similar to that on the left side surface of the first guide roller 381, thereby interfering with rolling on the right side surface of the first guide roller 381.

In the conventional case shown in FIG. 1, as the first swing guide roller 381 and the second guide roller 382 on the second stage are provided at the same level, the first cause that interferes with the effective twist imparted to the optical fiber 320 is solved. However, as second cause that the second guide roller 382 has the same roller width as that of the first guide roller 381 and that the optical fiber 320 can roll on the roller surface of the second guide roller 382 is left, it is still difficult to realize to effectively impart a twist to the optical fiber 320.

In the optical fiber manufacturing method of the present invention, an optical fiber is drawn from an optical fiber preform, the optical fiber is coated with a predetermined coating material, and a predetermined twist is imparted to the optical fiber coated with the predetermined coating material. In this case, the predetermined twist is imparted to the optical fiber by a combination of the substep of guiding the optical fiber with a first guide roller whose rotating shaft swings periodically, and rolling the optical fiber on a roller surface of the first guide roller, and the substep of guiding the optical fiber that has passed through the first guide roller with the second guide roller provided to a next stage and having a fixed rotating shaft and suppressing the optical fiber from rolling on a roller surface of the second guide roller with an optical fiber rolling suppression means provided to the second guide roller.

More specifically, when the optical fiber rolls on the roller surface of the first guide roller that swings, a predetermined twist is imparted to the optical fiber. At this time, if the optical fiber is let to freely roll on the roller surface of the second guide roller on the next stage, rolling of the optical fiber on the first guide roller is interfered with, and a twist is not effectively imparted to the optical fiber. For this reason, rolling of the optical fiber on the roller surface is suppressed by the optical fiber rolling suppression means provided to the second guide roller, so that a twist is highly efficiently imparted to the optical fiber by the first guide roller in accordance with the swing speed of the first guide roller. As a result, a twist can be effectively imparted to the optical fiber by the combination of the first guide roller that swings and the second guide roller provided with the optical fiber rolling suppression means.

An example of the optical fiber rolling suppression means provided to the second guide roller includes a V-shaped, U-shaped, or concave narrow groove which is formed in the roller surface. When the optical fiber is fitted in this narrow groove and guided, rolling of the optical fiber can be suppressed.

If the length with which the optical fiber contacts the roller surface of the first guide roller exceeds a roller circumference corresponding to a central angle 90°, the rolling direction of the optical fiber on a side where the optical fiber starts to be in contact with the roller and the rolling direction thereof on a side where the optical fiber is separated from the roller become opposite to each other. Since a rotary motion aiming at imparting a twist to the optical fiber is interfered with, a twist cannot be effectively imparted to the optical fiber. Therefore, the outer diameter and position of each of the first and second guide rollers are adjusted so that a length with which the optical fiber contacts the roller surface of the first guide roller is substantially equal to or less than a roller circumference corresponding to a central angle 90° of the first guide roller, thereby imparting a twist to the optical fiber effectively.

The twist to be imparted to the optical fiber is generated as the optical fiber rolls on the roller surface of the first guide roller. Hence, in order to realize ideal rolling of the optical fiber free from sliding on the roller surface, the coefficient of friction between the predetermined coating material of the optical fiber and the roller surface must be high. Accordingly, if the roller surface of the first guide roller with which the optical fiber is brought into contact is covered with a resin, e.g., an urethane resin or an acrylic resin, having a high coefficient of friction against the predetermined coating material of the optical fiber, the optical fiber can be rolled on the roller surface in an ideal manner, thereby imparting a twist to the optical fiber effectively.

In order to increase the frictional force on the roller surface of the first guide roller that acts on the predetermined coating material of the optical fiber, it is also effective to increase the drawing tension, thereby increasing the force with which the predetermined coating material of the optical fiber is urged against the roller surface of the roller. An increase in rolling properties achieved by an increase in frictional force appears when the optical fiber has a drawing tension of 4.0 kg/mm$^2$ or more. If the drawing tension exceeds 16 kg/mm$^2$, fiber disconnection occurs. Hence, the drawing tension must be 16 kg/mm$^2$ or less.

As the first guide roller swings, the optical fiber immediately before being brought into contact with the roller of the first guide roller responds. If this responsive motion of the optical fiber is left, the amount of twist to be imparted to the optical fiber may be decreased, or the thickness of the coating of the optical fiber may become non-uniform. Accordingly, the responsive motion of the optical fiber is suppressed by the optical fiber responsive motion suppressing means provided to a preceding stage of the first guide roller, thereby preventing a decrease in amount of twist imparted to the optical fiber and a non-uniformity in thickness of the coating of the optical fiber.

An example of the optical fiber responsive motion suppressing means includes at least a pair of guide rollers which are provided above the first guide roller at a predetermined distance to oppose each other at a predetermined gap through which the optical fiber is passed. When the optical fiber responds to the swing of the first guide roller by at least the pair of guide rollers, if the responsive motion of the optical fiber is within a predetermined range, the optical fiber passes between at least the pair of guide rollers. If the responsive motion exceeds the predetermined range, the optical fiber will contact either one of the guide rollers, so that its further responsive motion is interrupted. Therefore, at least the pair of guide rollers serve as the optical fiber responsive motion suppressing means.

The optical fiber according to the present invention comprises a core portion and a cladding portion covering the core portion, is imparted with a predetermined twist, and is characterized by being manufactured in accordance with the above manufacturing method.

The optical fiber of the present invention is manufactured in accordance with the above manufacturing method, has the core portion and the cladding portion covering the core portion, and is imparted with the predetermined twist. Therefore, even if the sectional shapes of the core portion and cladding portion of the optical fiber are not perfectly circular and concentric, polarization dispersion can be suppressed in the elongated optical fiber as a whole equivalently as in a case wherein the core portion and the cladding portion are perfectly circular and concentric. Since the non-uniformity in thickness of the coating of the optical fiber is suppressed, the stress distribution on the section of the optical fiber can be prevented from being asymmetric, thereby increasing the strength of the optical fiber when formed into a cable.

Embodiment 1

An example of the present invention will be described with reference to the accompanying drawings. In the explanation of the drawings, the same reference numerals denote the identical elements, and a repetitive explanation thereof will be omitted.

Figure 6:
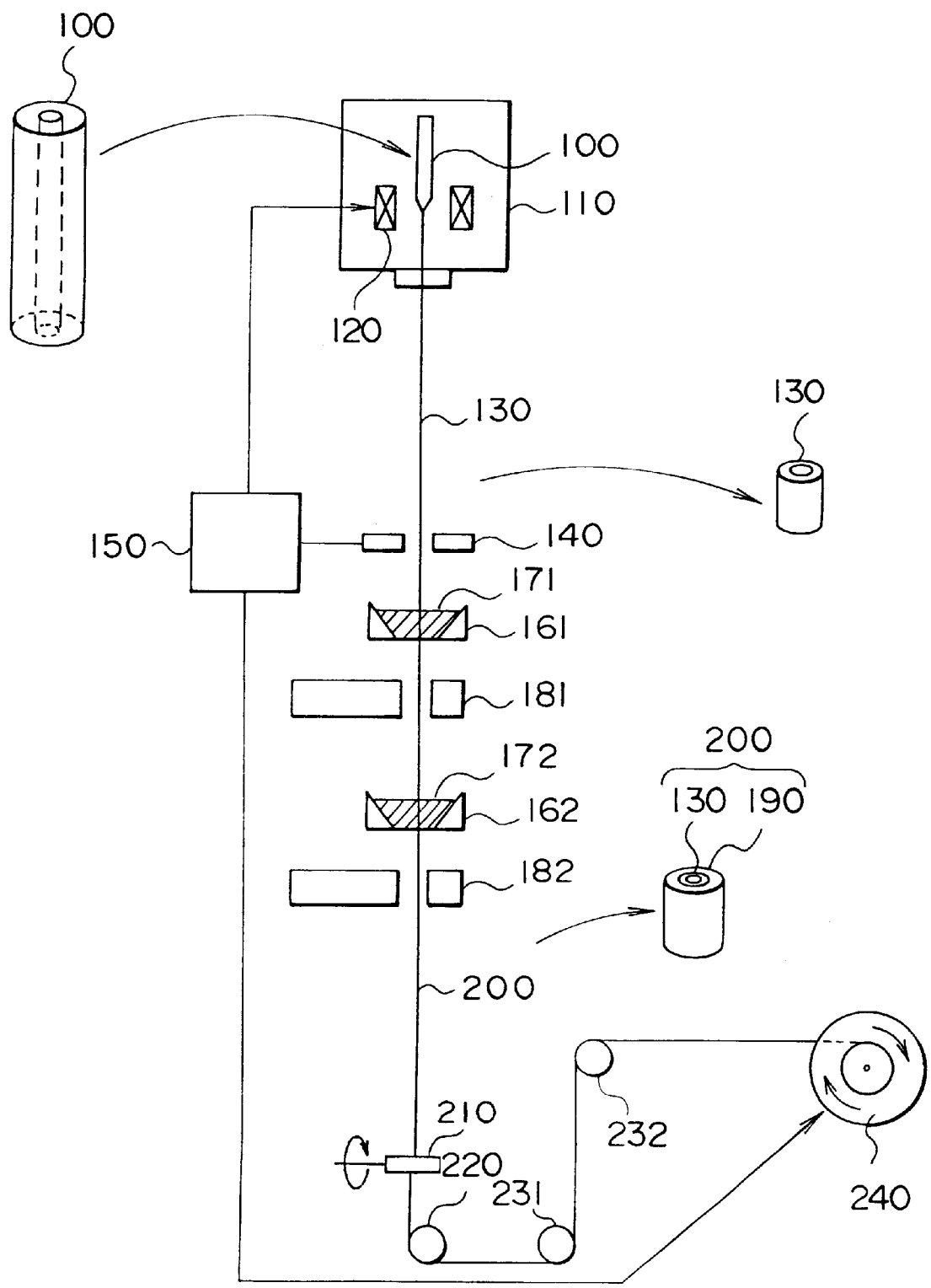
FIG. 6 is a process view showing an optical fiber manufacturing method according to the present invention.

FIG. 6 is a manufacturing process view of the optical fiber manufacturing method of the present invention.

As shown in FIG. 6, in the optical fiber manufacturing method of this embodiment, an optical fiber preform 100 is prepared. The optical fiber preform 100 is fabricated in accordance with a vapor-phase axial deposition method (VAD method), an outside vapor-phase deposition method (OVD method), a modified chemical vapor deposition method (MCVD method), a rod-in-tube method, and the like.

After the optical fiber preform 100 is set in a drawing furnace 110, the lower end of the optical fiber preform 100 is softened by heating by a heater 120 in the drawing furnace 110, and an optical fiber 130 is obtained by drawing. A drawing velocity Vp for this is, e.g., 100 m/min.

The diameter of the optical fiber 130 obtained by drawing is measured by a laser diameter measurement unit 140. The measurement result is reported to a drawing control unit 150. The drawing control unit 150 controls the heating temperature of the heater 120 and the drawing velocity Vp based on the measurement result such that the diameter of the optical fiber 130 becomes a predetermined value, usually 125 µm.

The optical fiber 130 is passed through a liquid resin 171 stored in a first resin coating die 161 to apply the first layer resin to its surface. Successively, an UV lamp 181 irradiates the optical fiber 130 applied with the first layer resin, thereby setting the first layer resin. The optical fiber 130 is then passed through a liquid resin 172 stored in a second resin coating die 162 in the same manner to apply the second layer resin to the surface of its first layer resin. Successively, an UV lamp 182 irradiates the optical fiber 130 applied with the second layer resin, thereby setting the second layer resin. In this manner, an optical fiber 200 is formed by coating the surface of the optical fiber 130 with a resin coating 190 consisting of two resin layers. The optical fiber 200 with the coating 190 has a diameter of, e.g., 250 µm.

Subsequently, the optical fiber 200 is passed between a pair of guide rollers 210 for optical fiber responsive motion suppression that rotate freely in the traveling direction of the optical fiber 200, and is successively and sequentially guided with a swing guide roller 220, a first stationary guide roller 231 provided on the next stage of the optical fiber 200, and a second stationary guide roller 232 provided on the next stage of the first stationary guide roller 231. Furthermore, the optical fiber 200 that has passed through the swing guide roller 220, the first stationary guide roller 231, and the second stationary guide roller 232 sequentially is taken up on a drum 240.

The pair of guide rollers 210 for optical fiber responsive motion suppression are located at a position right above the swing guide roller 220 at a distance L=100 mm from it, and a gap d between the pair of guide rollers 210 is 2 mm. The swing guide roller 220 has an outer diameter of 150 mm and a width of 30 mm. The material of the roller surface of the swing guide roller 220 is aluminum which is the material of the roller itself, and the rotating shaft of the swing guide roller 220 swings about an axis parallel to the tensile tower axis with a period of 100 rpm from an angle −θ to an angle +θ. The first stationary guide roller 231 is provided at a position just beside the swing guide roller 220 at a distance D=250 mm, and has an outer diameter of 150 mm and a width of 30 mm equal to those of the swing guide roller 220. However, the rotating shaft of the first stationary guide roller 231 is fixed, and a V-shaped narrow groove serving as an optical fiber rolling suppression means is formed at the central portion of the roller surface of the first stationary guide roller 231. With the combination of the pair of guide rollers 210 for optical fiber responsive motion suppression, the swing guide roller 220, and the first stationary guide roller 231 that are arranged under these conditions, a predetermined twist is imparted to the optical fiber 200 effectively, i.e., highly efficiently in accordance with the swing speed of the swing guide roller 220. The characteristic feature of this embodiment resides in this.

Figure 7:
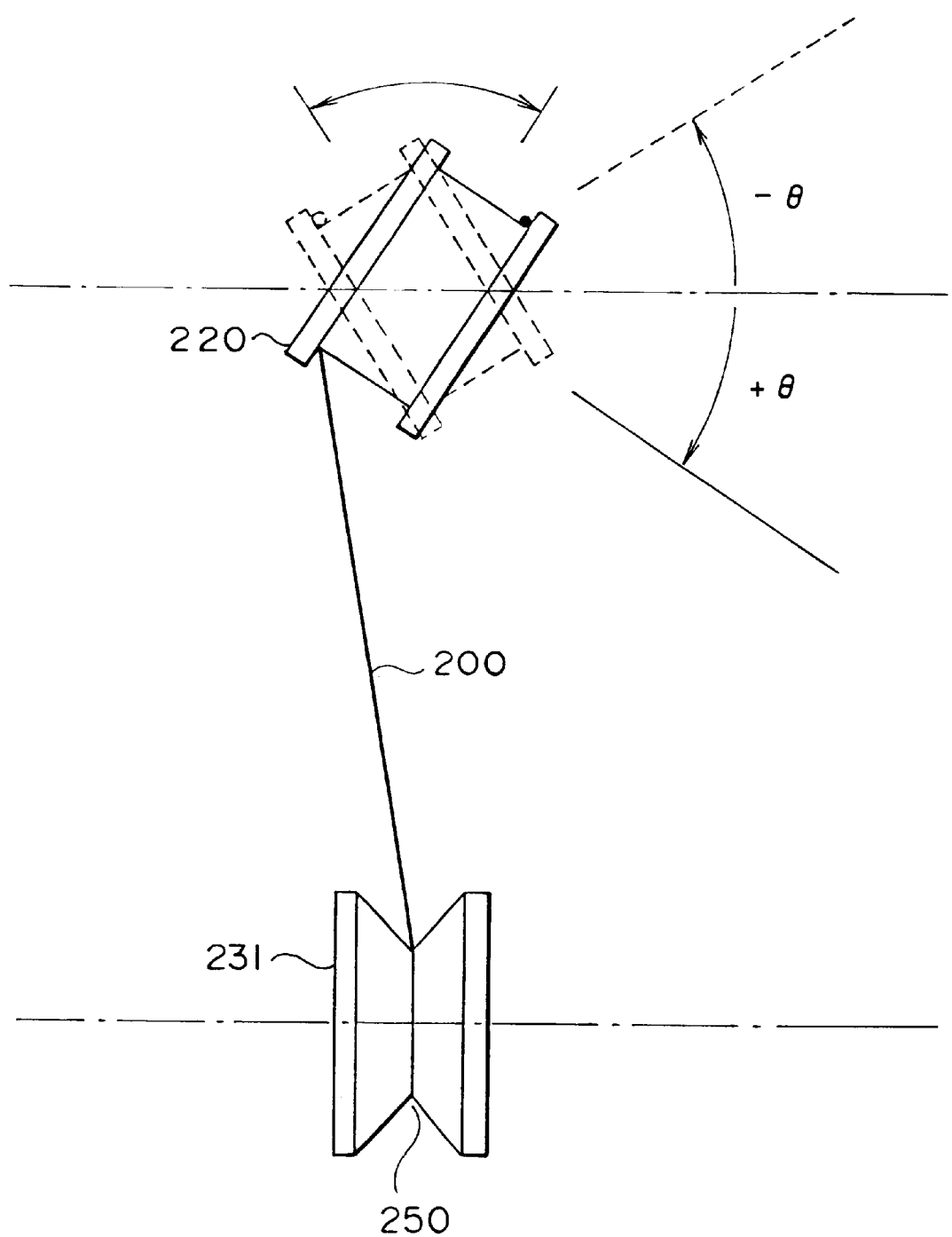
FIG. 7 is a view showing a swing guide roller and a first stationary guide roller of FIG. 6 when viewed from the above.
Figure 8:
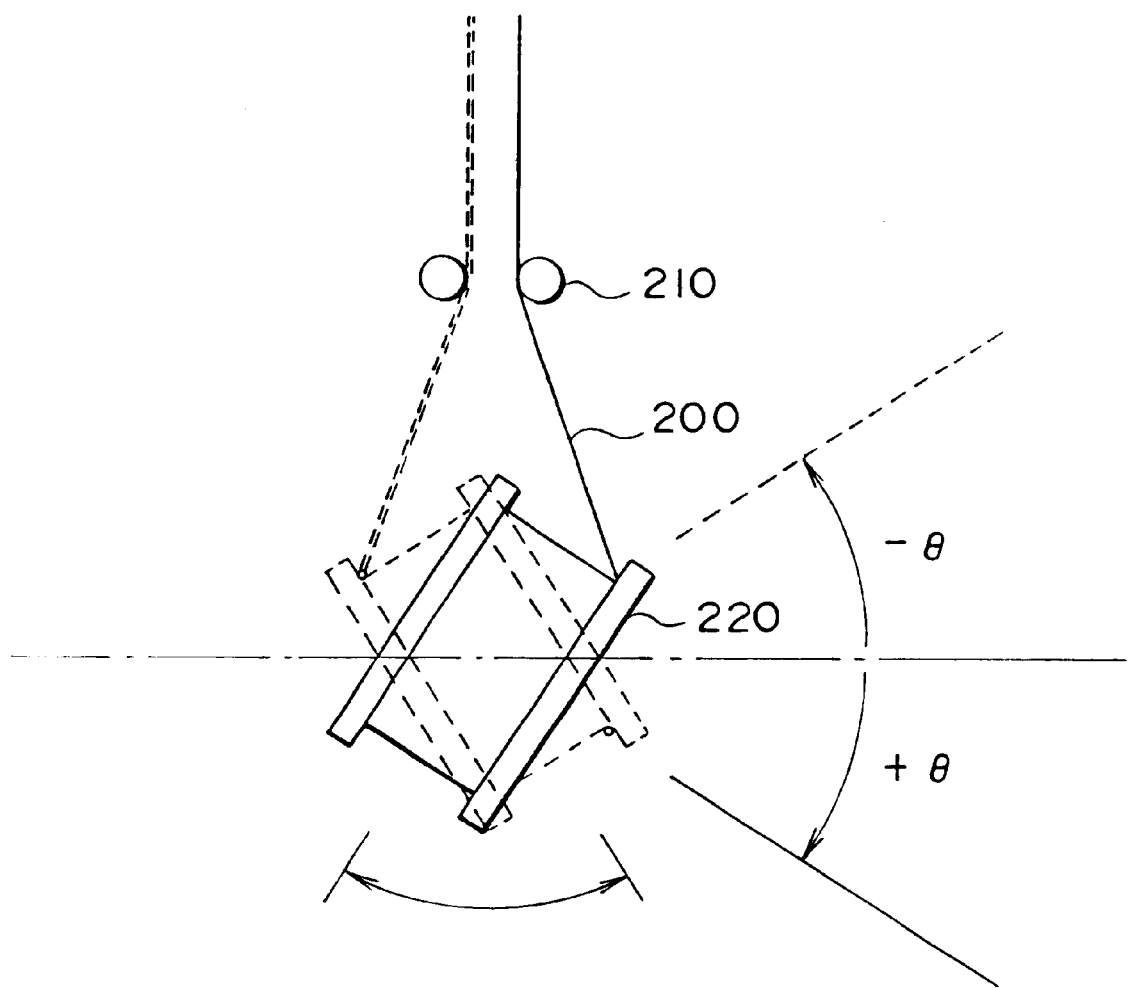
FIG. 8 is a view showing a pair of guide rollers for optical fiber responsive motion control and the swing guide roller when viewed from the side.

A method of imparting a predetermined twist to the optical fiber 200 effectively will be described with reference to FIGS. 7 and 8. FIG. 7 shows the swing guide roller 220 and the first stationary guide roller 231 of FIG. 6 when viewed from the above, and FIG. 8 shows the pair of guide rollers 210 for optical fiber responsive motion suppression and the swing guide roller 220 when viewed from the side.

As shown in FIG. 7, when the swing guide roller 220 is tilted about an axis parallel to the tensile tower axis by an angle +θ, a lateral force is applied to the optical fiber 200 by this tilt to roll the optical fiber 200 on the roller surface of the swing guide roller 220. A twist is imparted to the optical fiber 200 by this rolling. Subsequently, the swing guide roller 220 is tilted in the opposite direction by an angle −θ. When symmetric reciprocal motion in which the swing guide roller 220 swings from the angle +θ to the angle −θ is repeated, as indicated by a double-headed arrow in FIG. 7, a clockwise twist and a counterclockwise twist in the traveling direction are alternately imparted to the optical fiber 200.

As the first stationary guide roller 231 on the next stage of the swing guide roller 220 is provided just beside the swing guide roller 220 to have the same outer diameter as that of the swing guide roller 220, the length with which the optical fiber 200 contacts the roller surface of the swing guide roller 220 becomes substantially equal to the roller circumference corresponding to the central angle 90° of the swing guide roller 220. More specifically, the optical fiber 200 contacts the swing guide roller 220 along one side surface to the bottom surface of the swing guide roller 220, and is separated from it at its lowest portion. Thus, the following drawback can be prevented: the optical fiber 200 rolls on the other side surface of the roller to interfere with rolling of the optical fiber 200 on one side surface of the roller to cause the optical fiber 200 to slide on the swing guide roller 220. Accordingly, with rolling of the optical fiber 200 on one side surface of the roller of the swing guide roller 220, a twist can be imparted to the optical fiber 200 highly efficiently in accordance with the swing speed of the swing guide roller 220.

A V-shaped narrow groove 250 serving as the optical fiber rolling suppression means is formed at the central portion of the roller surface of the first stationary guide roller 231, and the optical fiber 200 guided by the first stationary guide roller 231 is fitted in the V-shaped narrow groove 250. Thus, the following drawback can be prevented: the optical fiber 200 rolls on the roller surface of the first stationary guide roller 231 to interfere with rolling of the optical fiber 200 on the swing guide roller 220 that aims at imparting a twist to the optical fiber 200. As a result, since rolling of the optical fiber 200 on the roller surface of the first stationary guide roller 231 is suppressed by the V-shaped narrow groove 250, a twist can be imparted to the optical fiber 200 highly efficiently in accordance with the swing speed of the swing guide roller 220.

As shown in FIG. 8, when the swing guide roller 220 is tilted about the axis parallel to the tensile tower axis by an angle +θ and the optical fiber 200 rolls on the roller surface of the swing guide roller 220, together with rolling of the optical fiber 200, the optical fiber 200 on the drawing furnace side immediately before the swing guide roller 220 also responds to swinging in the swing direction of the swing guide roller 220. If the responsive motion of the optical fiber 200 exceeds a predetermined range, the amount of twist to be imparted to the optical fiber 200 may be decreased, or the thickness of the optical fiber 200 coated with the resin coating 190 may become non-uniform. However, as the guide rollers 210 are provided immediately above the swing guide roller 220, when the responsive motion of the optical fiber 200 exceeds a predetermined value, the optical fiber 200 is brought into contact with one of the pair of guide rollers 210, so that its further responsive motion is prevented. Hence, when the pair of guide rollers 210 suppress the responsive motion of the optical fiber 200, a decrease in amount of twist imparted to the optical fiber 200 and the non-uniformity in thickness of the optical fiber 200 coated with the resin coating 190 can be suppressed.

In this manner, according to the optical fiber manufacturing method of this embodiment, as the pair of guide rollers 210 for optical fiber responsive motion suppression, the swing guide roller 220, and the first stationary guide roller 231 are combined, the swing guide roller 220 allows the optical fiber 200 to roll on its roller surface by its swing motion to impart a clockwise twist and a counterclockwise twist to the optical fiber 200 alternately, and the pair of guide rollers 210 for optical fiber responsive motion suppression and the first stationary guide roller 231 provided with the optical fiber rolling suppression means help smooth rolling of the optical fiber 200 on the roller surface of the swing guide roller 220. As a result, a twist can be imparted to the optical fiber 200 highly efficiently in accordance with the swing speed of the swing guide roller 220.

According to the optical fiber manufacturing method of this embodiment, when letting the optical fiber 200 to roll on the roller surface of the swing guide roller 220, the responsive motion of the optical fiber 200 can be suppressed by the pair of guide rollers 210 for optical fiber responsive motion suppression. Thus, the non-uniformity in thickness of the optical fiber 200 coated with the resin coating 190 can be suppressed.

The optical fiber 200 according to the present invention is manufactured in accordance with the above manufacturing method, has a core portion and a cladding portion covering the core portion, and is imparted with a clockwise twist and a counterclockwise twist alternately. Even if the sectional shapes of the core portion and cladding portion of the optical fiber 200 are not perfectly circular and concentric, polarization dispersion can be suppressed in the elongated optical fiber as a whole equivalently as in a case wherein the core portion and the cladding portion are perfectly circular and concentric.

In the optical fiber 200 coated with the resin coating 190 of the present invention, since the non-uniformity in its thickness is suppressed, the stress distribution on the section of the optical fiber 200 can be prevented from becoming asymmetric. Thus, the strength of the optical fiber 200 when formed into a cable can be increased.

In the above embodiment, the swing motion of the swing guide roller 220 is a symmetrically reciprocal motion from the angle −θ to the angle +θ, as shown in FIG. 7. However, the swing motion of the swing guide roller 220 is not limited to this, but can be, e.g., an asymmetric reciprocal motion in which the swing guide roller 220 swings from the zero angle to the angle +θ. In this case, a twist is intermittently imparted to the optical fiber 200. Also, the swing motion of the swing guide roller 220 may be a symmetric reciprocal motion in which the swing guide roller 220 swings in the direction of its rotating shaft. In this case, a clockwise twist and a counterclockwise twist are imparted to the optical fiber 200 alternately, in the same manner as in the above embodiment.

In the above embodiment, the V-shaped narrow groove 250 serving as the optical fiber rolling suppression means is formed in the first stationary guide roller 231. However, the same effect can be obtained by forming a U-shaped or concave narrow groove instead.

An experiment conducted by the present inventors in order to confirm the effects of the pair of guide rollers 210 for optical fiber responsive motion suppression, the swing guide roller 220, and the first stationary guide roller 231, which constitute the essential part of the above embodiment, and to obtain the optimum conditions for achieving these effects, and the result of the experiment will be described.

The first experiment aims at confirming the effect obtained by guiding the optical fiber 200 with the first stationary guide roller 231 provided with the optical fiber rolling suppression means. More specifically, a case wherein the V-shaped narrow groove 250 serving as the optical fiber rolling suppression means was formed in the first stationary guide roller 231, and the optical fiber 200 was fitted in the V-shaped narrow groove 250 and guided, and a case wherein no optical fiber rolling suppression means was provided to the first stationary guide roller 231 and an optical fiber could be rolled on the roller surface of the first stationary guide roller 231, were compared. Various other conditions were the same as in the case described with reference to FIGS. 6 and 7, except that the swing period of the swing guide roller 220 was changed between 0 and 200 rpm.

Figure 9:
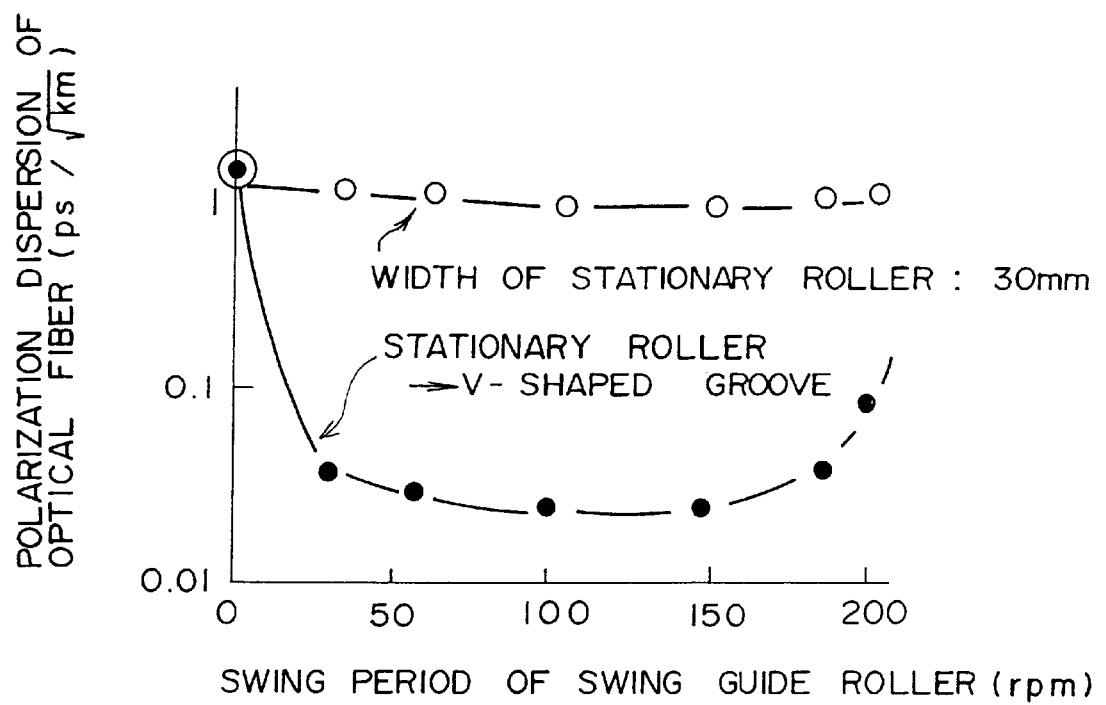
FIG. 9 is a graph for explaining the relationship between the presence/absence of the optical fiber rolling prevention means of the first stationary guide roller and the polarization dispersion of the optical fiber.

The graph of FIG. 9 shows the result of the first experiment. As is apparent from this graph, when no optical fiber rolling suppression means is provided to the first stationary guide roller 231 so that the optical fiber can be rolled on the roller surface of the first stationary guide roller 231, even if the swing period of the swing guide roller 220 is changed, the polarization dispersion of the optical fiber 200 is not decreased. In contrast to this, when the V-shaped narrow groove 250 serving as the optical fiber rolling suppression means is formed in the first stationary guide roller 231, the polarization dispersion of the optical fiber 200 is decreased in the entire swing period. This effect is conspicuous particularly in the swing period of 20 to 150 rpm, the preferred swing period being 50 to 100 rpm.

Accordingly, it is confirmed from the first experiment that the first stationary guide roller 231 provided with the optical fiber rolling suppression means helps the optical fiber 200 to roll smoothly on the roller surface of the swing guide roller 220, so that a twist is imparted to the optical fiber 200 highly efficiently in accordance with the swing speed of the swing guide roller 220.

Figure 10:
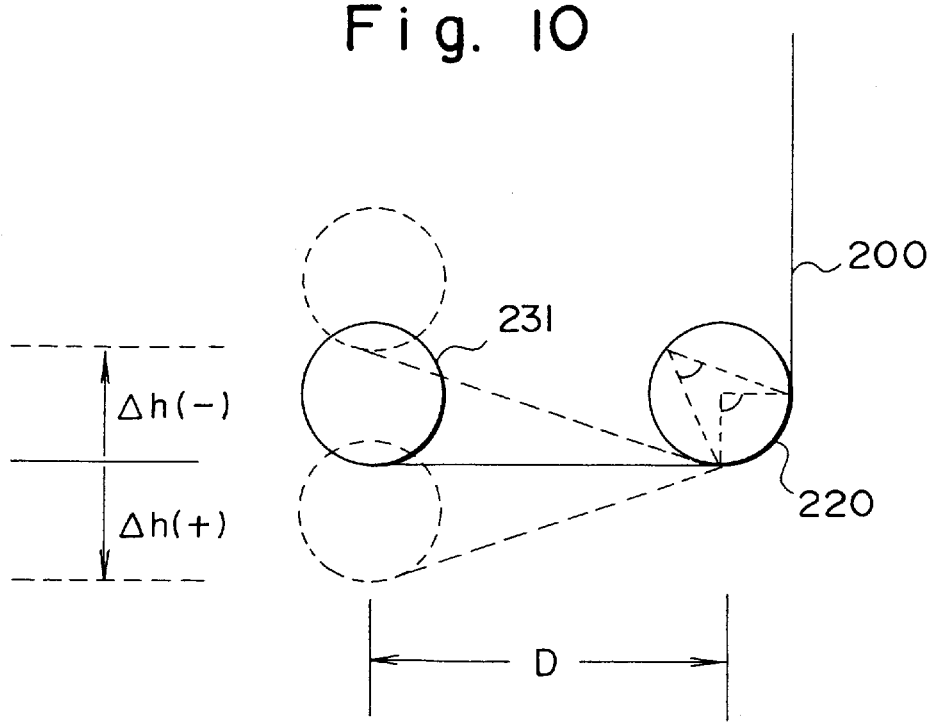
FIG. 10 is a view showing the positions of the swing guide roller and first stationary guide roller relative to each other.

The second experiment aims at obtaining the optimum conditions of the positions of the swing guide roller 220 and the first stationary guide roller 231 relative to each other. More specifically, as shown in FIG. 10, by employing a horizontal distance D (D=180 mm, 250 mm, and 500 mm) between the swing guide roller 220 and the first stationary guide roller 231 as the parameter, a relative height Δh (the downward and upward directions are defined as positive and negative, respectively) of the lowest portion of the first stationary guide roller 231 with respect to the lowest portion of the swing guide roller 220 was changed. The polarization dispersion of the optical fiber 200 obtained in this case was measured. Various other conditions were the same as in the case described with reference to FIGS. 6 and 7.

Figure 11:
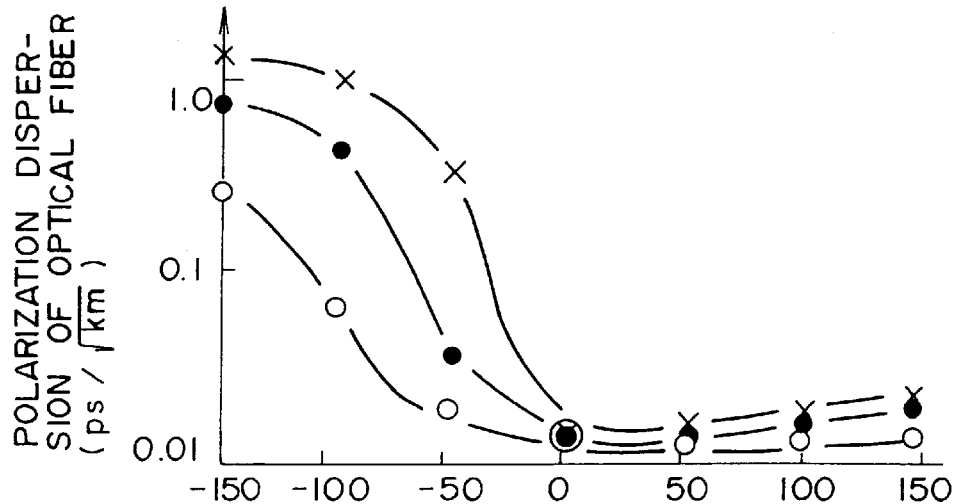
FIG. 11 is a graph showing the relationship between the position shown in FIG. 10 and the polarization dispersion of the optical fiber.

The graph of FIG. 11 shows the result of the second experiment. As is apparent from this graph, when the relative height Δh of the lowest portion of the first stationary guide roller 231 with respect to the lowest portion of the swing guide roller 220 satisfies $0 \leq \Delta h < 150$ mm, i.e., when the lowest portion of the first stationary guide roller 231 is of the same height as or relatively lower than the lowest portion of the first stationary guide roller 231, the polarization dispersion of the optical fiber 200 is decreased greatly as compared to a case wherein the relative height Δh satisfies $-150 \text{ mm} < \Delta h < 0$, i.e., a case wherein the lowest portion of the first stationary guide roller 231 is relatively higher than the lowest portion of the swing guide roller 220. The larger the horizontal distance D between the swing guide roller 220 and the first stationary guide roller 231, the larger the decrease in polarization dispersion of the optical fiber 200. However, when the relative height Δh satisfies $0 \leq \Delta h < 150$ mm, the difference in polarization dispersion is not so large.

The reason for this is as follows. When the relative height Δh satisfies $0 \leq \Delta h < 150$ mm, the length with which the optical fiber 200 contacts the roller surface of the swing guide roller 220 becomes equal to or less than the roller circumference corresponding to the central angle 90°, so that the optical fiber 200 is in contact with the swing guide roller 220 along one side surface to the bottom surface of the swing guide roller 220, and is separated from the swing guide roller 220 at the lowest portion of the swing guide roller 220 or immediately before it. In contrast to this, when the relative height Δh satisfies −150 mm<Δh<0, the length with which the optical fiber 200 contacts the roller surface of the swing guide roller 220 exceeds the roller circumference corresponding to the central angle 90°, so that the optical fiber 200 contacts the swing guide roller 220 along one side surface, the bottom surface, and the other side surface of the swing guide roller 220. More specifically, in the latter case, since the optical fiber 200 rolls even on the other side surface of the roller, rolling of the optical fiber 200 on one side surface, which aims at imparting a twist to the optical fiber 200, is interfered with. In contrast to this, in the former case, since such a situation does not occur, the optical fiber 200 can be rolled smoothly, so that a twist can be imparted to the optical fiber 200 highly efficiently in accordance with the swing speed of the swing guide roller 220.

Accordingly, from the second experiment, it is confirmed that the positions of the swing guide roller 220 and the first stationary guide roller 231 relative to each other are preferably adjusted such that a length with which the optical fiber 200 contacts the roller surface of the first guide roller 220 is substantially equal to or less than a roller circumference corresponding to a central angle 90° of the first guide roller.

In the above description, both the optical fiber 200 and the first stationary guide roller 231 have the same diameter. Even if the diameters are different, the object can be achieved by paying attention to the relative height Δh of the lowest portion of the first stationary guide roller 231 with respect to the lowest portion of the swing guide roller 220. This means that the length with which the optical fiber 200 contacts the roller surface of the swing guide roller 220 can be adjusted also by changing the outer diameters of the swing guide roller 220 and the first stationary guide roller 231.

The third experiment aims at obtaining the optimum material of the roller surface of the swing guide roller 220. More specifically, in FIGS. 6 and 7, as the material of the roller surface, aluminum, which is the material of the roller itself, was employed. In contrast to this, in the third experiment, the polarization dispersion of the optical fiber 200 was measured while changing the material of the roller surface variously. Various other conditions were the same as in the case described with reference to FIGS. 6 and 7, except that the swing period of the swing guide roller 220 was changed between 0 and 200 rpm.

Figure 12:
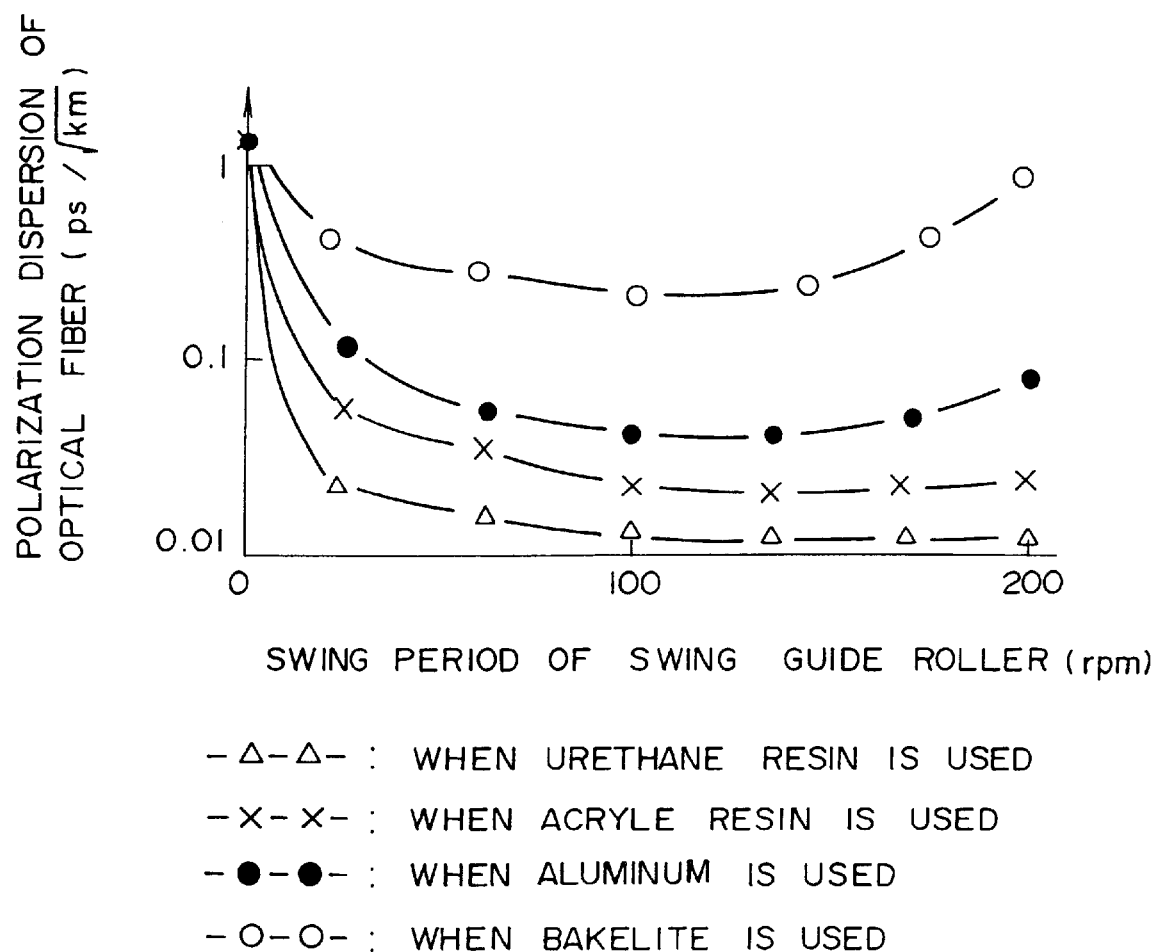
FIG. 12 is a graph for explaining the relationship between the material of the roller surface of the swing guide roller and the polarization dispersion of the optical fiber.

The graph of FIG. 12 shows the result of the third experiment. When the swing guide roller 220 is not swung at all, no difference in polarization dispersion resulted from the difference in material of the roller surface. In contrast to this, as is apparent from this graph, when the swing guide roller 220 is swung, the polarization dispersion of the optical fiber 200 is decreased in the entire swing period in the order of an urethane resin, an acrylic resin, aluminum, and Bakelite that are employed as the materials of the roller surfaces. In particular, in the swing period of 20 to 150 rpm, the decrease in polarization dispersion of the optical fiber 200 is the largest with the urethane resin, and the second largest with the acrylic resin. The preferred swing period is 50 to 100 rpm.

The effect of decreasing the polarization dispersion of the optical fiber 200 corresponds to the magnitude of the coefficient of friction of the material of the roller surface against the resin coating 190 applied on the surface of the optical fiber 200. More specifically, the higher the coefficient of friction of the material of the roller surface against the resin coating 190 on the surface of the optical fiber 200, the more ideal rolling of the optical fiber 200 without sliding on the roller surface. This rolling imparts a twist to the optical fiber 200, thereby decreasing the polarization dispersion of the optical fiber 200.

Accordingly, from the third experiment, it is confirmed that the roller surface of the first guide roller 220 with which the optical fiber 200 is brought into contact is preferably covered with a resin having a high coefficient of friction against the resin coating 190 of the optical fiber 200, and that an urethane resin or an acrylic resin is suitable as this resin.

The fourth experiment aims at obtaining the relationship between the rolling properties on the roller surface of the swing guide roller 220 and the drawing tension of the optical fiber 200. More specifically, as the material of the roller surface, aluminum, which is the material of the roller itself, was employed, as shown in FIGS. 6 and 7, and the swing period was set to 100 rpm. Rolling frequencies were observed while changing the drawing tension. The optical fiber 200 with the coating was set to 250 μm.

Figure 13:
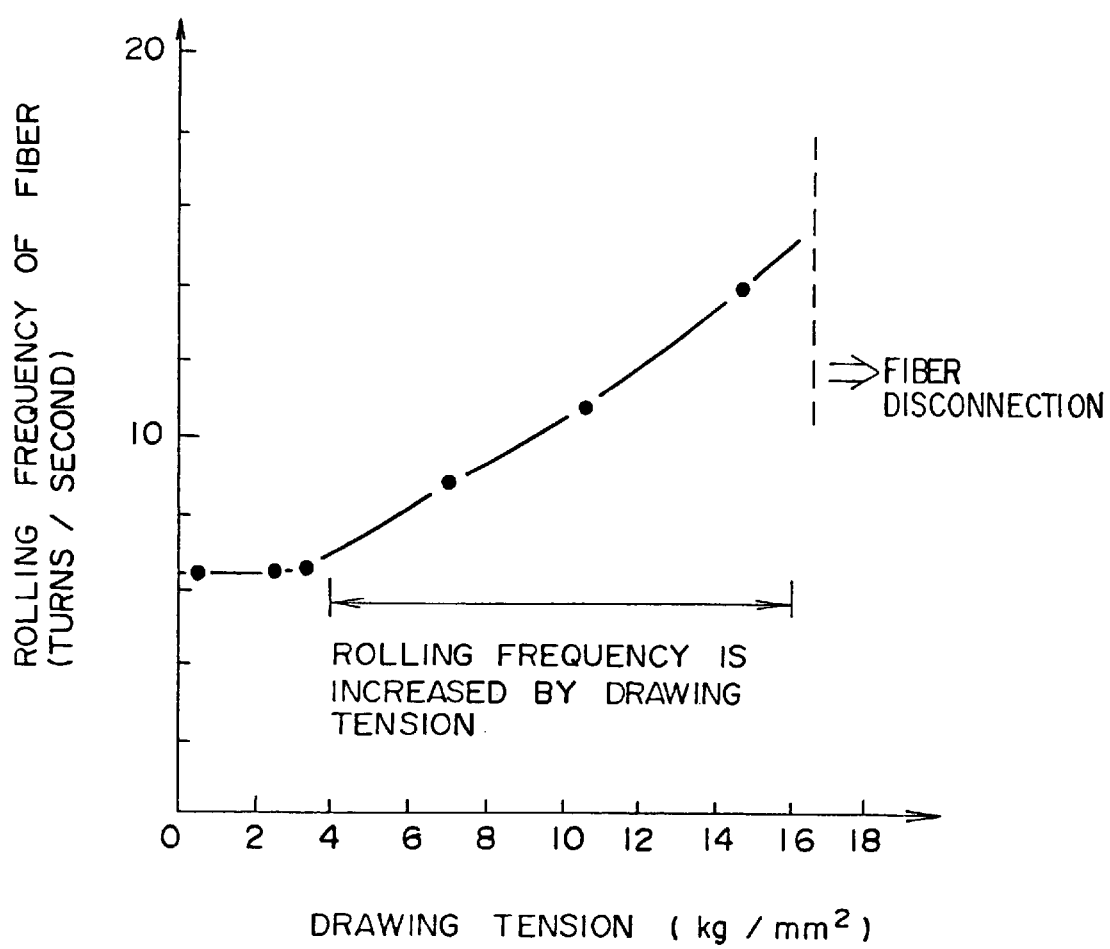
FIG. 13 is a graph for explaining the relationship between the fiber tensile force and the rolling properties on the roller surface of the swing guide roller.

The graph of FIG. 13 shows the result of the fourth experiment. As is apparent from this graph, an improvement in rolling properties appears when the drawing tension is 4.0 kg/mm$^2$ or more. Fiber disconnection occurs when the drawing tension exceeds 16 kg/mm$^2$.

As a result, from the fourth experiment, it is confirmed that the drawing tension of the optical fiber 200 is preferably 4.0 kg/mm$^2$ or more and 16 kg/mm$^2$ or less.

Figure 14:
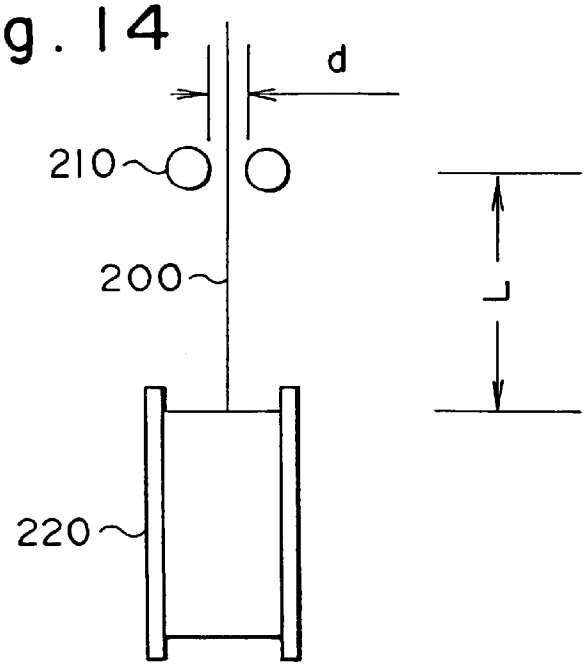
FIG. 14 is a diagram showing the installation position of the pair of guide rollers for optical fiber responsive motion control relative to the swing guide roller.

The fifth experiment aims at obtaining the optimum conditions for the relative position of the pair of guide rollers 210 for optical fiber swing suppression, that rotate freely in the traveling direction of the optical fiber 200, with respect to the swing guide roller 220, and the gap between the pair of guide rollers 210. More specifically, as shown in FIG. 14, by employing a vertical distance L (L=30 mm, 50 mm, 100 mm, and 200 mm) between the swing guide roller 220 and one of the pair of guide rollers 210 as the parameter, a gap d between the pair of guide rollers 210 was changed from 1 mm to 8 mm. The polarization dispersion of the optical fiber 200 obtained in this case was measured. Various other conditions were the same as in the case described with reference to FIGS. 6 and 7. In order to confirm the effect obtained by allowing free rotation of the pair of guide rollers 210 in the traveling direction of the optical fiber 200, the polarization dispersion was measured also in a comparative or test case against which the method of the invention was compared, in which comparative or test case the guide rollers 210 were fixed so as not to be rotatable during that comparative or test case.

Figure 15:
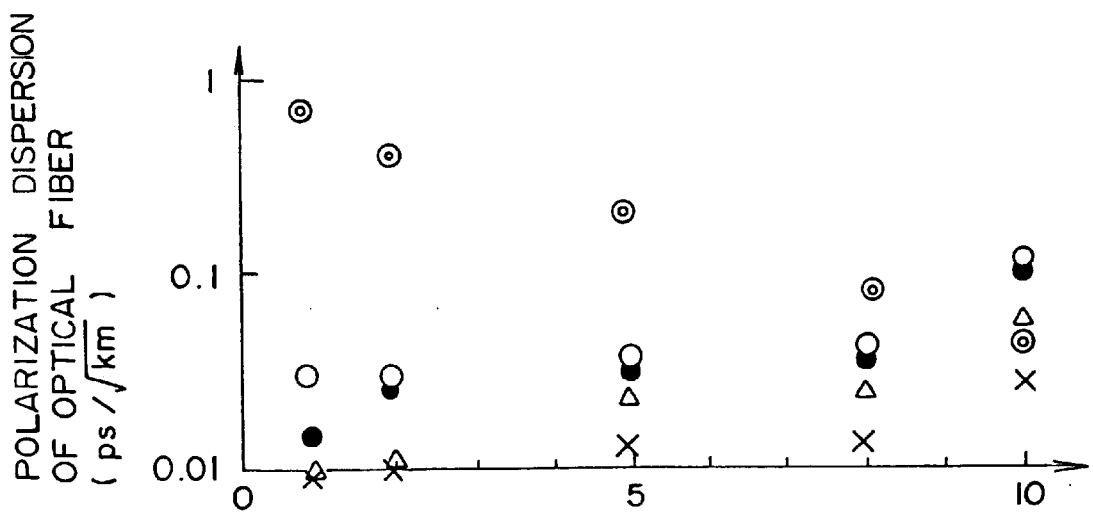
FIG. 15 is a graph for explaining the relationship between the gap between the pair of guide rollers and the polarization dispersion of the optical fiber.

The graph of FIG. 15 shows the result of the fifth experiment. As is apparent from this graph, the shorter the vertical distance L between the swing guide roller 220 and the pair of guide rollers 210, the smaller the polarization dispersion of the optical fiber 200, and the smaller the gap d between the pair of guide rollers 210, the smaller the polarization dispersion of the optical fiber 200. In particular, when L=30 mm, the polarization dispersion is decreased largely regardless of d. When L=50 mm, the polarization dispersion is largely decreased with d=1 mm to 2 mm.

This means that the pair of guide rollers 210 suppress the responsive motion of the optical fiber 200 that occurs in response to the swing of the swing guide roller 220, thereby suppressing a decrease in amount of twist of the optical fiber 200 which is caused by the responsive motion of the optical fiber 200. The shorter the vertical distance L between the swing guide roller 220 and the pair of guide rollers 210, and the smaller the gap d between the pair of guide rollers 210, the larger the effect of suppressing the responsive motion of the optical fiber 200. Thus, the effect of decreasing the polarization dispersion of the optical fiber 200 may also be increased accordingly due to this.

When the pair of guide rollers 210 are set not to be rotatable, the polarization dispersion of the optical fiber 200 is generally larger than in a case wherein the pair of guide rollers 210 are rotatable regardless of the magnitude of the distance L. However, the larger the gap d, the smaller the polarization dispersion of the optical fiber 200. When d=10 mm, there is substantially no difference in polarization dispersion when compared to the case wherein the pair of guide rollers 210 are rotatable.

A non-uniformity ratio in thickness of the optical fiber 200 coated with the resin coating 190 was measured under the same conditions as those of the fifth experiment. Note that when the non-uniformity ratio in thickness is 0%, the sectional shapes of the core portion and the cladding portion of the optical fiber 200 become perfectly circular and concentric. Although the result of measurement is not shown in the graph, when the gaps d=1 mm, 2 mm, 5 mm, 8 mm, and 10 mm, the non-uniformity ratios in thickness was 15%, 20%, 35%, 40%, and 45%, respectively, regardless of the magnitude of the distance L. More specifically, the smaller the gap d, the lower the non-uniformity ratio in thickness, and the less the non-uniformity in thickness of the optical fiber 200 coated with the resin coating 190.

This may be because the smaller the gap d between the pair of guide rollers 210, the more the responsive motion of the optical fiber 200 is suppressed, and the smoother the optical fiber 200 can roll on the roller surface of the swing guide roller 220. The non-uniformity ratio in thickness of the optical fiber 200 coated with the resin coating 190 may be decreased by smooth rolling of the optical fiber 200.

Accordingly, the following facts are confirmed from the fifth experiment. The pair of guide rollers 210 for optical fiber responsive motion suppression which rotate freely in the traveling direction of the optical fiber 200 help the optical fiber 200 to roll smoothly on the roller surface of the swing guide roller 220, thereby imparting a twist to the optical fiber 200 highly efficiently in accordance with the swing speed of the swing guide roller 220. The smaller the vertical distance L between the pair of guide rollers 210 and the swing guide roller 220, and the smaller the gap d between the pair of guide rollers 210, then the larger the effect of helping imparting the twist. Also, the non-uniformity in thickness of the optical fiber 200 coated with the resin coating 190 is decreased. The smaller the gap d between the pair of guide rollers 210, the larger the thickness non-uniformity decreasing effect.

As has been described above in detail, the optical fiber manufacturing method of the present invention comprises the first substep of guiding the optical fiber with the first guide roller whose rotating shaft swings periodically, and rolling the optical fiber on the roller surface in accordance with swing of the first guide roller, and the second substep of guiding the optical fiber that has passed through the first guide roller with the second guide roller provided to a next stage of said first guide roller and having a fixed rotating shaft, and suppressing the optical fiber from rolling on a roller surface of the second guide roller with the optical fiber rolling suppression means provided to the second guide roller, thereby imparting a predetermined twist to the optical fiber effectively.

If the manufacturing method further comprises the substep of suppressing a responsive motion of the optical fiber, which is caused by the swing of the first guide roller, with an optical fiber responsive motion suppressing means provided on a preceding stage of the first guide roller, a predetermined twist can be imparted to the optical fiber more effectively, and the non-uniformity in thickness of the coating of the optical fiber can be suppressed.

Furthermore, as the optical fiber of the present invention is manufactured in accordance with the above manufacturing method and is imparted with a predetermined twist, even if the sectional shapes of its core portion and cladding portion are not perfectly circular and concentric, polarization dispersion can be suppressed in the elongated optical fiber as a whole equivalently as in a case wherein the core portion and the cladding portion are perfectly circular and concentric. Since the non-uniformity in thickness of the coating of the optical fiber is suppressed, the stress distribution on the section of the optical fiber can be prevented from being asymmetric, thereby increasing the strength of the optical fiber when formed into a cable.

Embodiment 2

An apparatus for swinging the swing guide roller 220 will be described. It is ideal that the swing guide roller 220 swing sinusoidally. More specifically, it is ideal that a swing angle θ (see FIG. 7) of the swing guide roller 220 change sinusoidally as a function of time. At least, the change over time of the swing angle θ must be such that the maximum clockwise angle and the maximum counterclockwise angle are equal, that the period of the clockwise swing and the period of the counterclockwise swing are equal, and that the swing angular velocity changes smoothly. These conditions are required as the change over time of the swing angle θ. Then, when the optical fiber is formed into a cable, a kink will not be formed, thereby preventing the optical fiber from being easily fractured.

Figure 16:
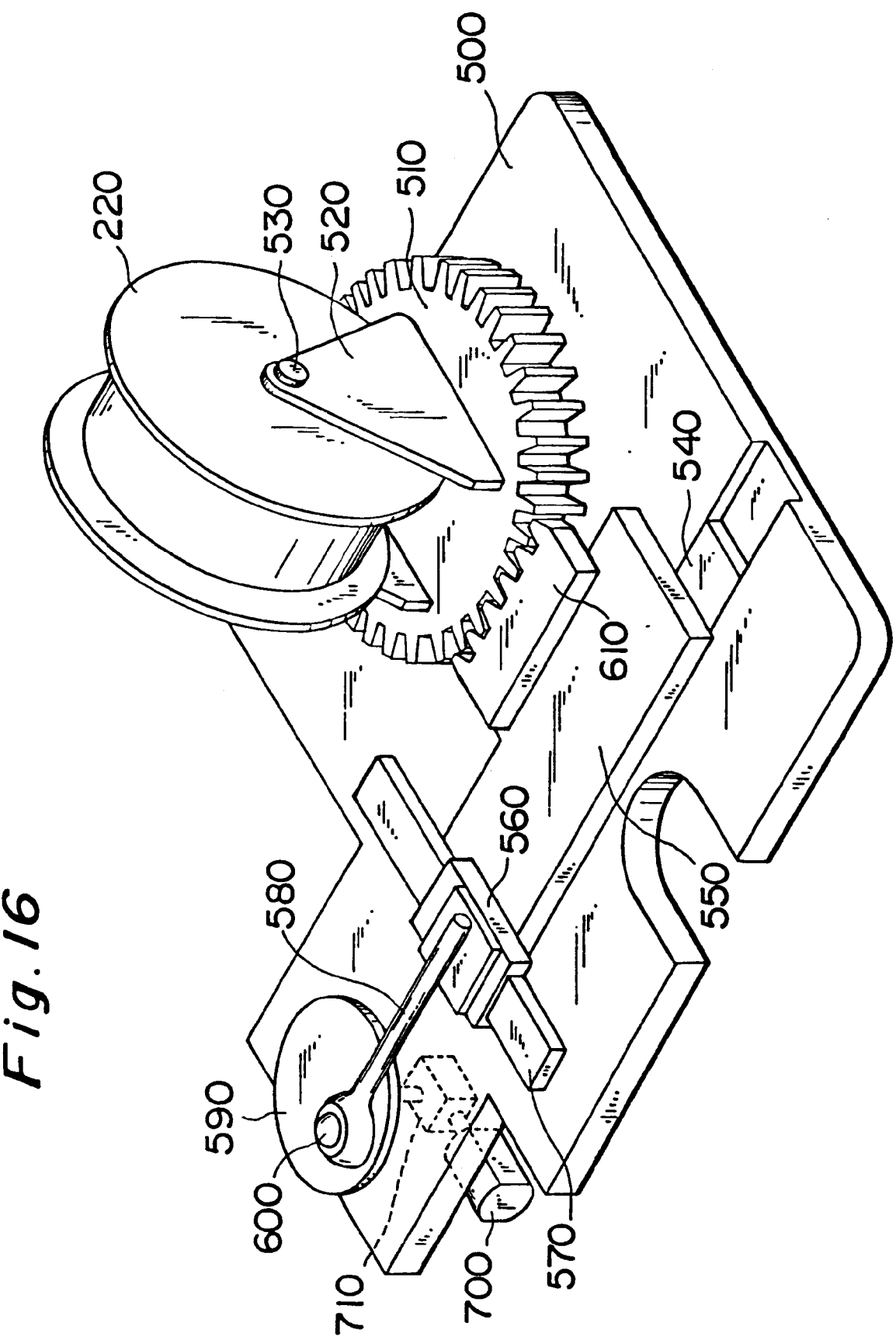
FIG. 16 is a perspective view of a mechanism that swings the swing guide roller such that the swing angle changes sinusoidally.

FIG. 16 is a perspective view of an example of a mechanism that swings the swing guide roller 220 such that the swing angle θ changes sinusoidally. A gear 510 is rotatably mounted on a base 500 with its rotating shaft being directed vertically. A roller base 520 is mounted on the upper surface of the gear 510, and the swing guide roller 220 is rotatably mounted on a rotating shaft 530 projecting from the 510 roller base 520 horizontally.

A movable portion 550 is mounted on the base 500 through a first linear guide 540. Accordingly, the movable portion 550 can move in a predetermined direction with respect to the base 500. A base portion 570 of a second linear guide 560 is fixed to the movable portion 550. The second linear guide 560 is movable along the base portion 570. The moving direction of the first linear guide 540 is perpendicular to the moving direction of the second linear guide 560. One end of an arm 580 is fixed to the second linear guide 560, and the other end of the arm 580 is rotatably mounted on a pin 600 projecting from a rotary disk 590. The rotary disk 590 is mounted on the output shaft of a motor 700 and a reduction gear 710 and is rotated. A rack gear 610 is fixed to the movable portion 550, and the rack gear 610 meshes with the gear 510.

The operation of the mechanism shown in FIG. 16 will be described. First, the rotary disk 590 is rotated by the output from the motor which is decelerated by the reduction gear. This rotation rotates the pin 600 in turn, and one end of the arm 580 moves along a circumference. Since the arm 580 is mounted on the base 500 through the two linear guides 540 and 560, it does not rotate with respect to the base 500. Accordingly, the other end of the arm 580 also moves along the circumference, so that the second linear guide 560 also moves along the circumference. Since the base portion 570 of the second linear guide 560 can move only in a predetermined linear direction (i.e., in the moving direction of the first linear guide 540), its position changes sinusoidally. The position of the movable portion 550 to which the base portion 570 is fixed also changes sinusoidally, so that the position of the rack gear 610 also changes in the same manner. Accordingly, the rotation angle of the gear 510 changes sinusoidally, so that the swing angle θ of the swing guide roller 220 mounted to the gear 510 also changes sinusoidally.

FIGS. 17A to 17D show plan views of the optical fiber drawing apparatus in each steps in fiber drawing viewed from a top of the apparatus, that is, from optical fiber feeding direction.

Figure 17A:
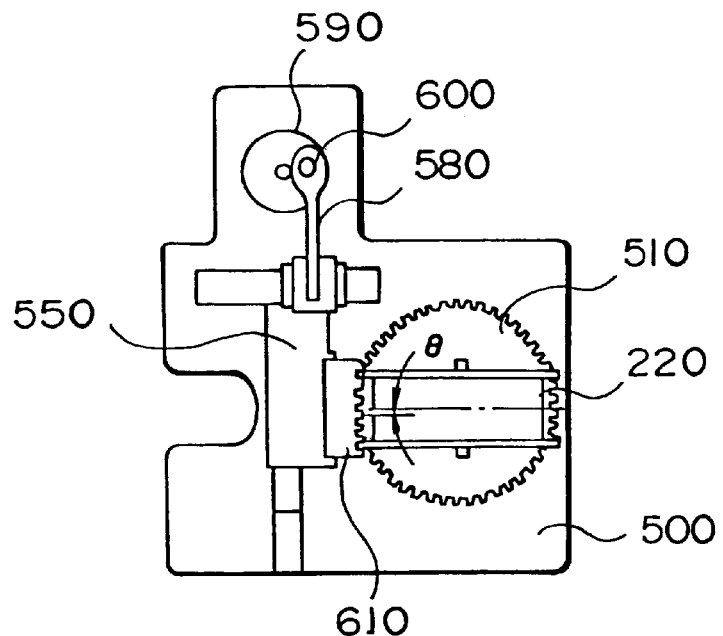
FIGS. 17A, 17B, 17C and 17D are plan views of the mechanism shown in FIG. 16 in each status in the drawing of the optical fiber.

FIG. 17A shows a status that the pin 600 is located in right side against a center of the rotary disk 590. In this status, the first movable portion 550 is located in a substantially center of a stroke thereof. In this status, the rack gear 610 is also located in substantially center of the stroke thereof and an angle of the pinion gear 510 is the same as an center angle of the swing range thereof. Accordingly, a swing angle θ of the swing guide roller is substantially zero.

Figure 17B:
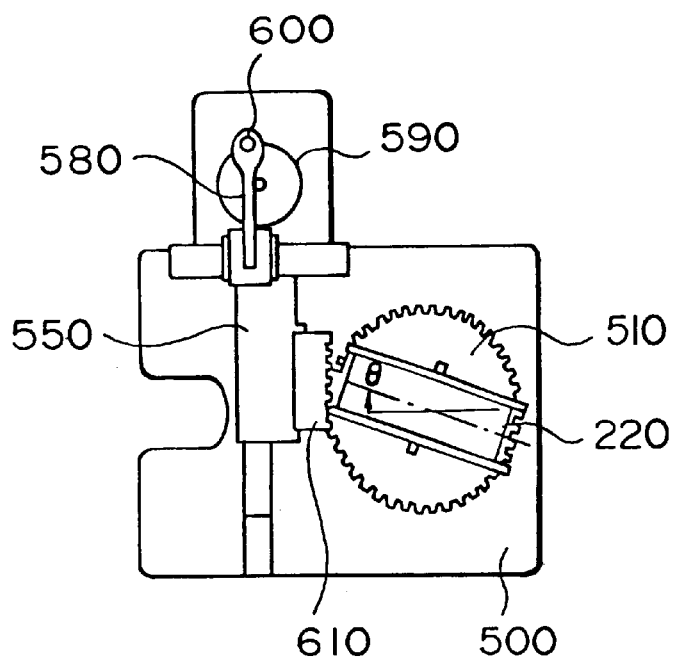

Next, the motor 700 rotates at a constant velocity and the rotary plate 590 is rotated in a counterclockwise direction by about 90 degree by a driving power transmitted from the motor 700 through the reduction gear 710. This status is shown in FIG. 17B. As shown in FIG. 17B, the pin 600 is located in an upper position of a center of the rotary plate 590, the position of the first movable portion 550 is substantially identical to one of a maximum stroke position, the position of the rack gear 610 is substantially identical to one of the maximum stroke position, and an angle of the pinion gear 510 is substantially identical to one of maximum swing angle. Accordingly a swing angle θ of the swing guide roller 220 becomes maximum.

Figure 17C:
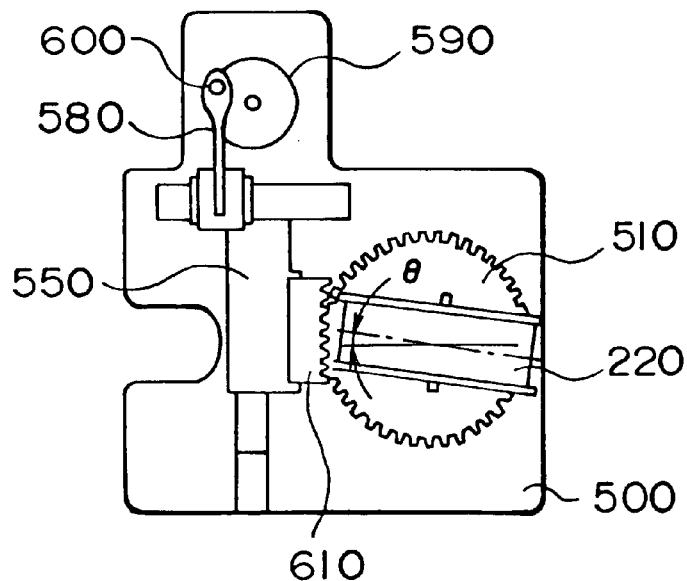

Further, the motor 700 rotates at a constant velocity and the rotary plate 590 is further rotated in a counterclockwise direction by about 90 degree by a driving power transmitted from the motor 700 through the reduction gear 710. This status is shown in FIG. 17C. As shown in FIG. 17C, the pin 600 is located in an left side of a center of the rotary plate 590, the position of the first movable portion 550 is located in a center of the stroke thereof again, an angle of the rack gear 610 is located in a center of the stroke thereof again, and an angle of the pinion gear 510 becomes a center angle of the swing range thereof again. Accordingly a swing angle θ of the swing guide roller 220 becomes zero again.

Figure 17D:
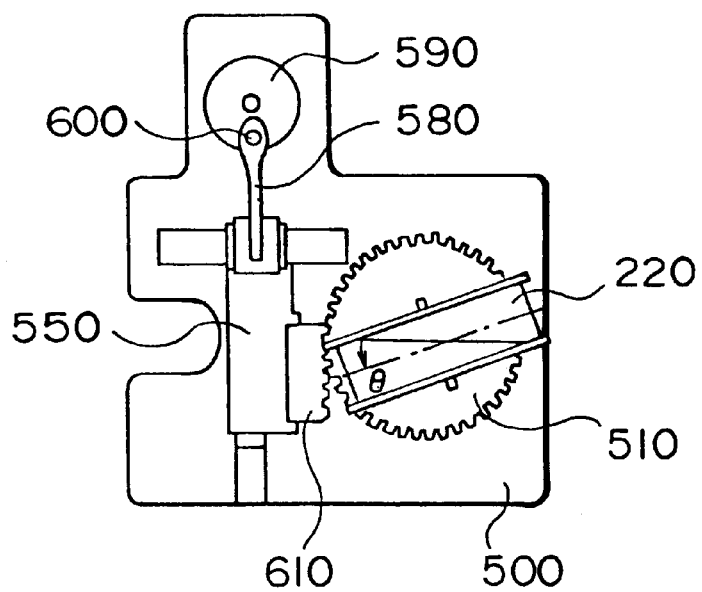

More further the motor 700 rotates at a constant velocity again and the rotary plate 590 is rotated in a counterclockwise direction by about 90 degree by a driving power transmitted from the motor 700 through the reduction gear 710. This status is shown in FIG. 17D. As shown in FIG. 17D, the pin 600 is located in a lower position of a center of the rotary plate 590, the position of the first movable portion 550 is substantially identical to the other of a maximum stroke position again, the position of the rack gear 610 is substantially identical to the other of the maximum stroke position again, and an angle of the pinion gear 510 is substantially identical to one of maximum swing angle. Accordingly a swing angle θ of the swing guide roller 220 becomes maximum and a sign of the swing angle is opposite to that shown in FIG. 17B.

The period of the swing of the swing guide roller is set preferably to be 20 to 150 rpm and further preferably to be set 50–100 rpm. This is because in this range of the swing period, the polarization dispersion of the result optical fiber 200 effectively decreases.

Besides, it is important that in the drawing, the drawing optical fiber does not come in contact with any portion of the roller 220, especially a flange thereof and further, the change of the swing should be smoothly and the time period during the swing direction changes should be zero.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 7-041820 (041820/1995) filed on Mar. 1, 1995, No. 7-281809 (281809/1995) filed on Oct. 30, 1995 and 8-057881 (057881/1996) filed on Mar. 14, 1996 are hereby incorporated by reference.

What is claimed is:

1. An optical fiber drawing method for reducing polarization characteristic of an optical fiber, comprising:

drawing said optical fiber from an optical fiber preform;

coating said optical fiber with a predetermined coating material; and guiding said optical fiber coated with said predetermined coating material with a first guide roller that swings periodically, and rolling said optical fiber on a roller surface of said first guide roller in accordance with the swing of said first guide roller; and guiding said optical fiber that has passed through said first guide roller with a second guide roller provided to a next stage of said first guide roller and having a fixed rotating shaft and suppressing said optical fiber from rolling on a roller surface of said second guide roller with an optical fiber rolling suppression portion provided to said second guide roller, wherein the swing of said first guide roller is such that the maximum clockwise angle and the maximum counterclockwise angle of said first guide roller are equal, such that a period of the clockwise swing which is the time from the beginning to the end of the clockwise swing of said first guide roller and a period of the counterclockwise swing which is the time from the beginning to the end of the counterclockwise swing of said first guide roller are equal, and such that a swing direction of said first guide roller is reversed smoothly without stopping when the swing angle of said first guide roller becomes maximum, wherein an optical fiber responsive motion suppressing means is provided to a preceding stage of said first guide roller, said means comprises at least one pair of responsive motion suppressing rollers which are provided above said first guide roller at a predetermined distance, said responsive motion suppressing rollers opposing each other at a predetermined gap through which said optical fiber is passed.

2. A method according to claim 1, wherein a width of said roller surface of said first guide roller on which said optical fiber can be rolled, is not less than 3 mm.

3. A method according to claim 1, wherein said first guide roller has flanges at both sides of said roller surface, and wherein said optical fiber does not come into contact with said flanges when the swing angle of said first guide roller becomes maximum.

\* \* \* \* \*